United States Patent [19]
Jackson et al.

[11] Patent Number: 5,344,083
[45] Date of Patent: Sep. 6, 1994

[54] IRRIGATION MOVERS

[76] Inventors: Brent Jackson, 3847 S. 1750 E.;
Marvin Jackson, 1652 E. 4000 S.,
both of, Vernal, Utah 84078

[21] Appl. No.: 117,478

[22] Filed: Sep. 7, 1993

[51] Int. Cl.[5] .............................................. B05B 3/18
[52] U.S. Cl. ................................... 239/737; 239/726;
239/725; 180/346
[58] Field of Search ............... 239/726, 737, 735, 743,
239/744, 748, 742, 288; 180/346, 84, 357, 366,
373

[56] References Cited

U.S. PATENT DOCUMENTS

| | | | |
|---|---|---|---|
| 1,858,784 | 5/1932 | Masury | 180/346 |
| 1,936,847 | 11/1933 | Masury | 180/346 |
| 3,516,609 | 6/1970 | Gheen et al. | 239/737 |
| 3,926,372 | 12/1975 | Johnson | 239/726 |
| 4,016,902 | 4/1977 | Vollmer | 239/737 |
| 4,072,205 | 2/1978 | Batson | 239/737 |

FOREIGN PATENT DOCUMENTS 1434257  5/1976  United Kingdom ................ 239/742

OTHER PUBLICATIONS

Brochure dated Jun. 1985, for Wade Rain 70 Series Hydrostatic Mover manufactured by Wade Manufacturing Co. of Tualatin, Oreg.

Primary Examiner—Andres Kashnikow
Assistant Examiner—Christopher G. Trainor
Attorney, Agent, or Firm—Lynn G. Foster

[57] ABSTRACT

Coverings, canopies, or housing each having a removable bottom wall which collectively substantially encapsulates each drive chain of an irrigation mover is disclosed, which prevent or substantially alleviate drive chain link corrosion and which statically extend fore and aft of an engine of the irrigation mover along the frame thereof.

17 Claims, 5 Drawing Sheets

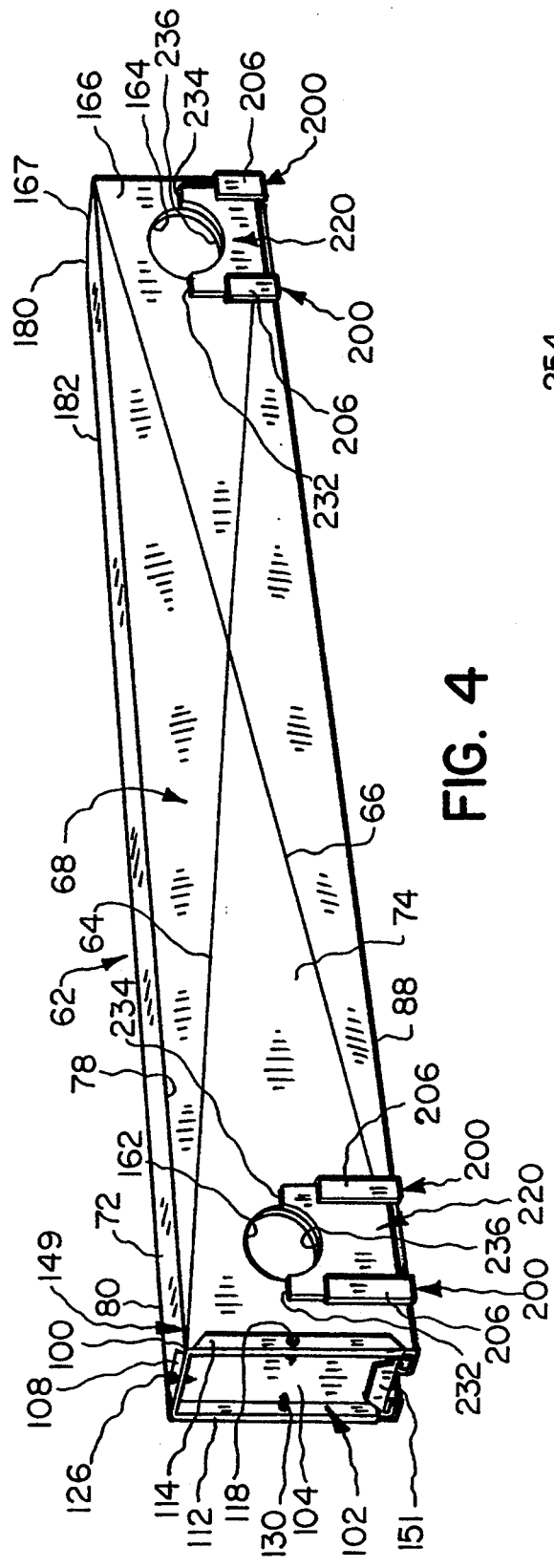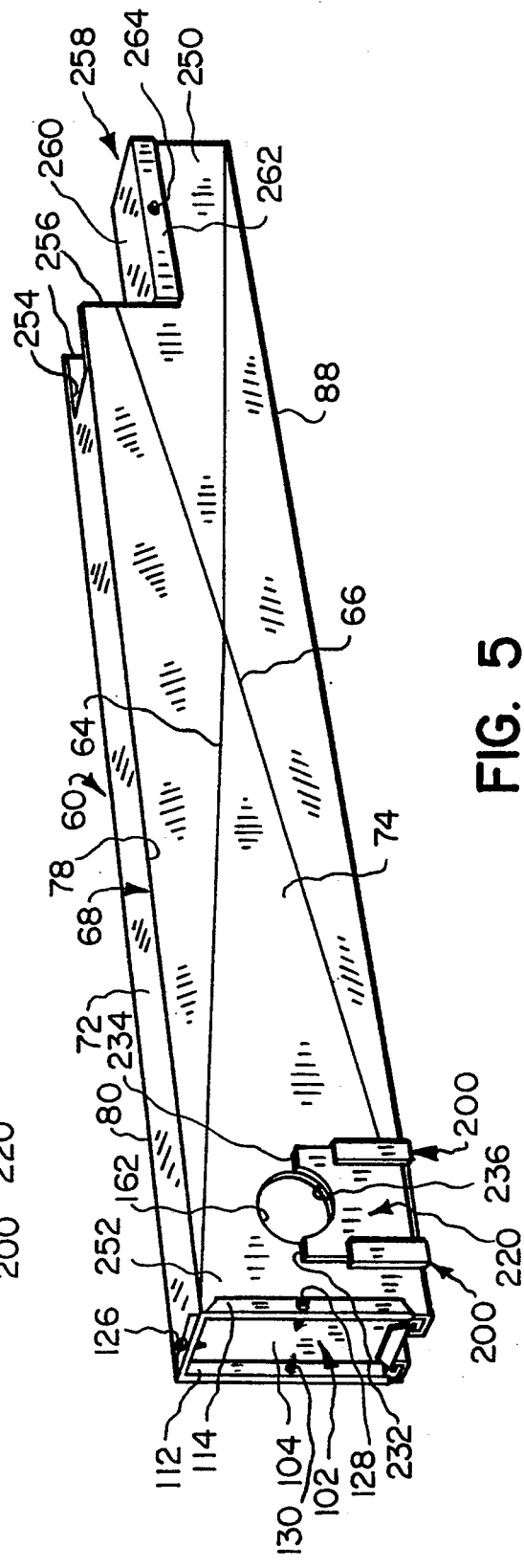

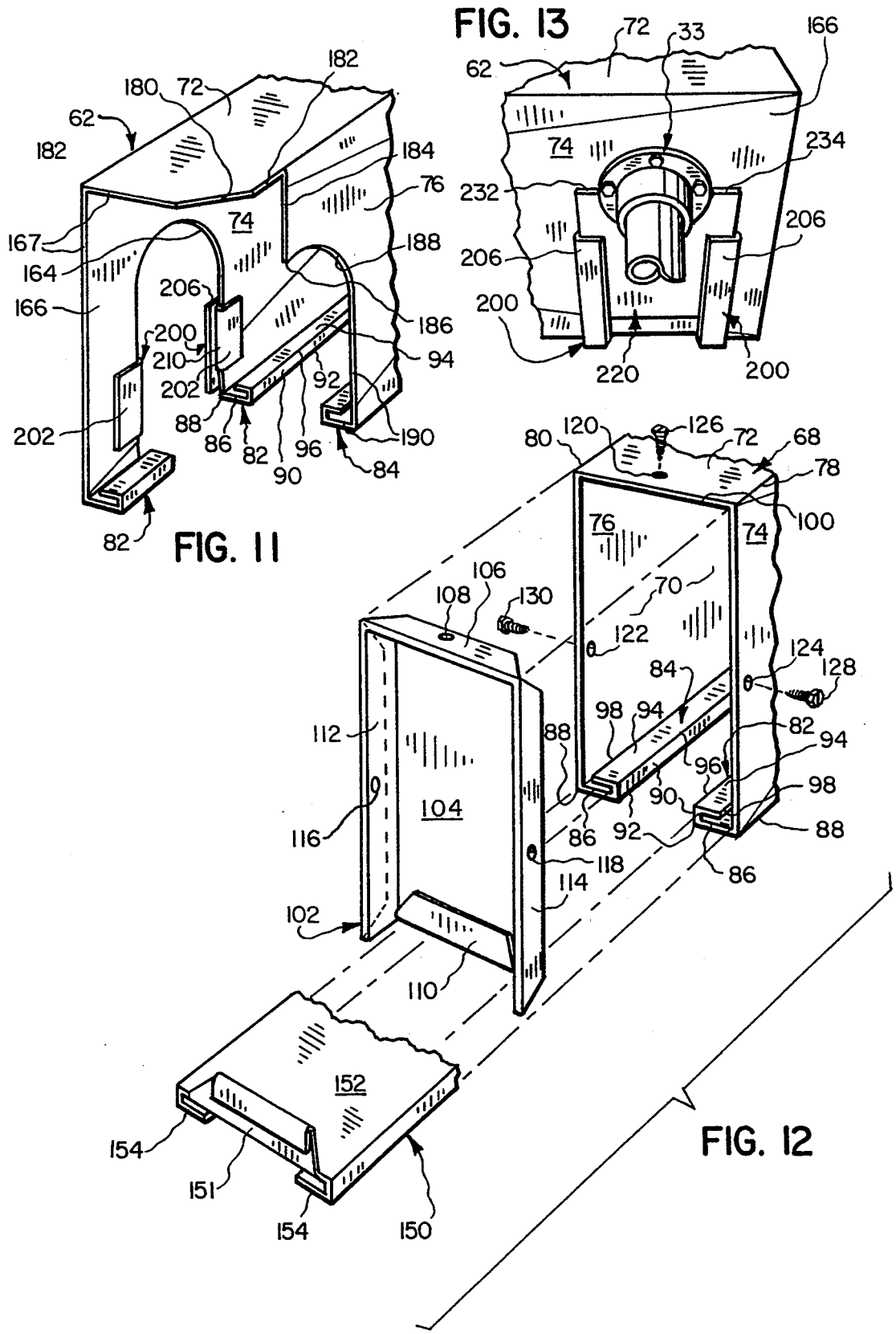

IRRIGATION MOVERS

FIELD OF INVENTION

The present invention relates generally to the field of irrigation and more particularly to the improvements for irrigation movers by which the useful life of the drive chain thereof is substantially extended.

BACKGROUND

Irrigation movers are and for some time have been commercially available from a number of sources. Each comprises a frame upon which a drive motor is centrally mounted, adjacent to a transversely disposed, wheel carried irrigation pipe. Each irrigation mover also comprises a pair of wheels located at each end of the frame. A drive train comprising gears driven by the motor and fore and aft drive chains which are gear displaced and in turn drive the wheel pairs through sprockets.

The chains are elongated and extend from beneath the motor several feet fore and aft to wheel pairs so as to be atmospherically exposed. Thus, as the nozzles of the irrigation pipe release water, the spray is liberally deposited continuously upon the drive chains, among other things.

The continuous, long-term exposure to the irrigation spray causes certain deleterious effects to the drive chains, including but not limited to rust, calcium corrosion and loss of lubrication. As a consequence, the chains no longer turn frequently around sprockets and gears and breakage is common, resulting in a shortening of useful life of the drive chains and down time which interrupts irrigation at times when plants are in need of water. The above mentioned problem of water damage to the drive trains has been a long-standing problem.

BRIEF SUMMARY AND OBJECTS OF THE PRESENT INVENTION

In brief summary, the present invention overcomes or substantially alleviates the aforesaid problem of the prior art. A covering, canopy or housing which substantially encapsulates each drive chain of an irrigation mover is provided, which statically extends along the frame, terminates at one end adjacent to the drive motor and at the other end at a wheel drive sprocket.

With the foregoing in mind, it is a primary object of this invention to overcome or substantially alleviate the long-standing problem of damage to drive chains of irrigation movers due to exposure to irrigation spray.

Another important object is the provision of a novel covering, canopy or housing which substantially encapsulates the drive chain without interference with operation.

These and other objects and features of the present invention will be apparent from the detailed description taken with reference to the accompanying drawings.

BRIEF DESCRIPTION OF THE DRAWINGS

FIG. 4 is an enlarged perspective representation of one canopy of FIG. 3;

FIG. 5 is an enlarged perspective representation of the other canopy of FIG. 3;

FIG. 11 is an enlarged fragmentary perspective from one side of the front or proximal portion of the rear canopy;

FIG. 12 is an enlarged exploded fragmentary perspective of the trailing or distal end of the trailing canopy disposed adjacent the rear wheels of the irrigation mover; and FIG. 13 is an enlarged fragmentary perspective of the front right portion of the rear canopy illustrating the manner in which the irrigation pipe passes through the front right portion of the rear canopy.

DETAILED DESCRIPTION OF THE ILLUSTRATED EMBODIMENTS

Reference is now made to the drawings wherein like numerals are used throughout to designate like parts throughout.

Figures 1, 2:
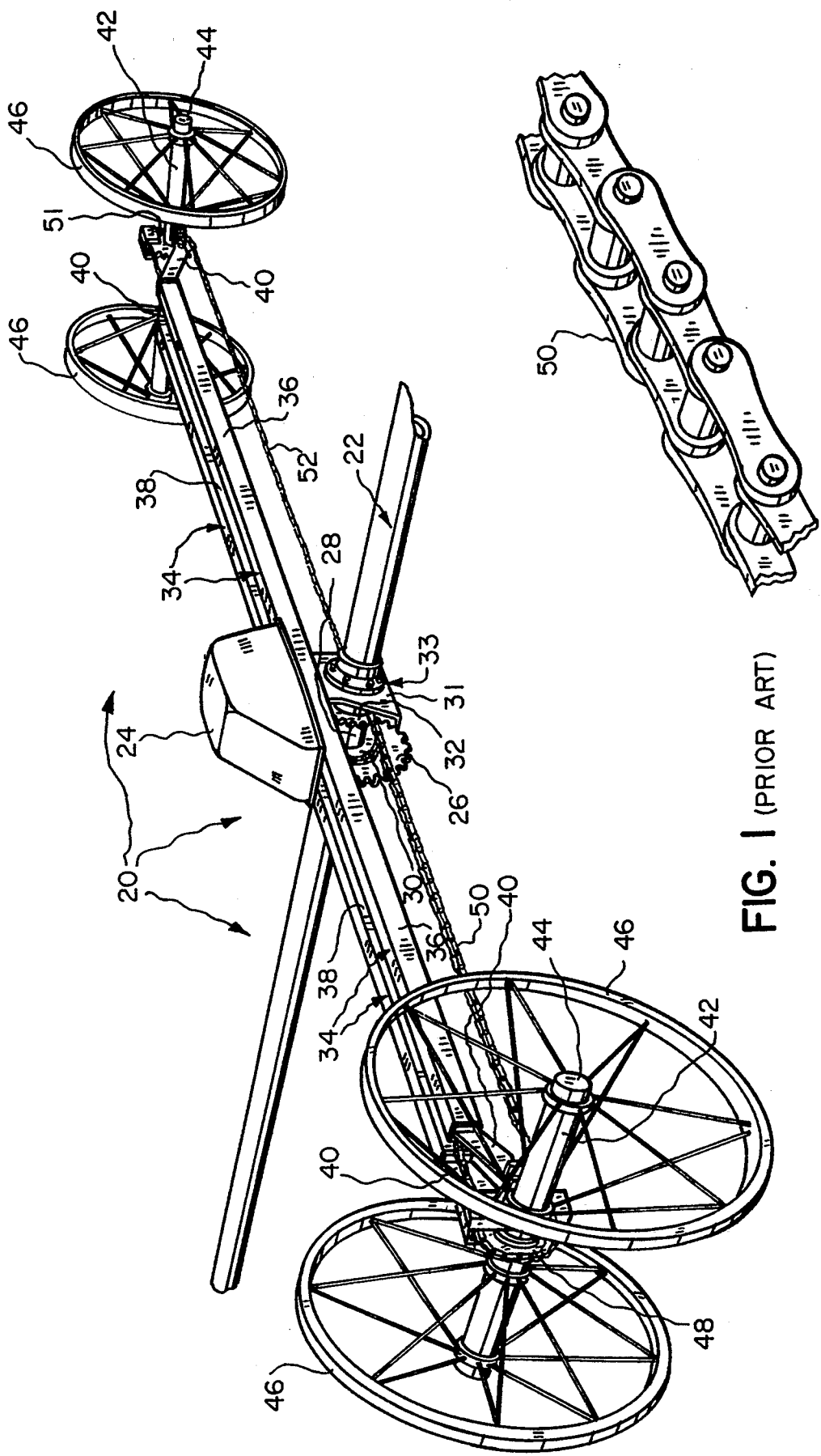
FIG. 1 is a perspective representation of a conventional irrigation mover.
FIG. 2 is an enlarged fragmentary perspective of a segment of a conventional drive chain of the irrigation mover of FIG. 1.

FIG. 1 illustrates a conventional irrigation mover, generally designated 20, by which a long irrigation pipe, generally designated 22, is linearly displaced across a field to be irrigated. Irrigation mover 20 is intended to be representative of any irrigation mover.

The irrigation pipe 22 is supported at spaced locations remote from the irrigation mover by wheels (not shown) and water, under pressure, is conventionally delivered to the irrigation pipe 22 and conventionally discharged therefrom by elevated nozzles (not shown) connected in liquid communicating relation with the interior of the pipe 22.

At a desired location along the irrigation pipe 22, the irrigation mover 20 is non-rotatably secured to the irrigation pipe 22. Thus, as the irrigation mover 20 is slowly moved across the field to be irrigated, the irrigating pipe 22 translates therewith.

The irrigation mover comprises a centrally located, upwardly projecting housing 24 beneath which is located a small internal combustion engine (not shown). Any one of Models H50, H60, H70, HH50, HH60, HH70 manufactured by Tecumseh Engines is suitable. Conventionally, the internal combustion engine disposed beneath hood 24 turns a conventional drive train comprising a large drive sprocket 26, which in turn rotates a hollow drive shaft 28 (through which the irrigation pipe 22 passes). The drive shaft 28 in turn is non-rotatably attached to and, therefor, rotates drive sprockets 30 and 32, respectively.

A U-shaped lower housing 31, which partially encloses the sides and bottom area in the vicinity of the sprockets 26, 30, and 32. The irrigation pipe 22 passes through the lower housing 31 and is secured thereto by ring fasteners 33, one being disposed on each side of the lower housing 31. The irrigation pipe 22 passes completely through the two ring connectors 33, which are secured to the lower housing 31 by screws or bolts.

The hood 24 rests upon and is secured to an elongated frame, generally designated 34, of the irrigation mover 20. The frame is conventional and comprises two spaced parallel beams or rails 36 and 38, respectively. Each beam 36 and 38, as illustrated, comprises a hollow rectangular configuration, in cross-section. See FIG. 7 especially. A solid, angularly disposed gusset plate 40, located at each end of each beam 36 and 38, conventionally attaches to an adjacent cylindrical axle housing 42 in which a wheel axle 44 is disposed. Two wheels 46 are non-rotatably connected to the ends of each axle 44. Thus, as each axle 44 is rotated, the two associated wheels 46 are also caused to rotate. The trailing axle 44 has a centrally disposed drive sprocket 48 conventionally non-rotatably secured thereto so that rotation of the sprocket 48 causes the associated axle 44 and the two associated wheels 46 to rotate.

Similarly, the front axle 44 conventionally has a centrally disposed drive sprocket 51 non-rotatably secured thereto so that rotation of sprocket 51 causes a corresponding rotation of the associated front axle 44 and the two associated front wheels 46.

A front drive chain 52 spans tautly between and around the teeth of drive sprockets 30 and 51 so that rotation of the drive shaft 28 by the engine beneath the hood 24 causes rotation of the sprocket 30, displacement of the drive chain 52, and rotation of the front drive sprocket 51 and the associated front axle 44 and front wheels 46.

Similarly, a chain drive 50 spans between and engages the teeth of sprockets 32 and 48 so that rotation of the drive shaft 28 by the engine rotates sprocket 32, displaces chain 50, and rotates sprocket 48, causing the rear axle 44 and the rear wheels 46 to rotate.

A short section of the drive chain 50 is illustrated in FIG. 2. Drive chains 50 and 52 are preferably structurally identical.

It is to be appreciated that the irrigation mover 20, as illustrated in FIG. 1, and the drive chains thereof, as illustrated in FIG. 2, are conventional. There are a number of irrigation movers available for purchase with which the principles of the present invention may be utilized. One such irrigation mover is a Wade Rain 70 Series Hydrostatic Mover manufactured by Wade Manufacturing Company, 9995 S.W. Avery Street, Tualatin, Oreg. 97062. With any irrigation mover to which the principles of the present invention apply, it is to be appreciated that the rate of linear movement of the irrigation pipe 22 across a field is very slow. This is by design, in order to cause the irrigation spray being emitted from the elevated nozzles thereof to thoroughly saturate the soil as the irrigation mover 20 slowly translates the irrigation pipe 22.

For many years, all irrigation movers have left the drive chains continuously exposed to the continuous spray issuing from the irrigation nozzles thereby creating a long-standing problem. More specifically, the constant wetting of the chains by the irrigation spray from nozzles disposed adjacent to the irrigation mover 20 washes the lubricant from the chains 50 and 52. As a consequence, the metal of the drive chains 50 and 52 is directly and continuously exposed to the water, which, within a relatively short period of time, corrodes the joints existing between the links of the chain so that relative rotation of the links is inhibited or prohibited. As a consequence, the useful life of the chains 50 and 52 is greatly reduced. Commonly, the corroded joints between the links of the chains will cause the chains to break as they attempt to turn upon the sprockets.

Figure 3:
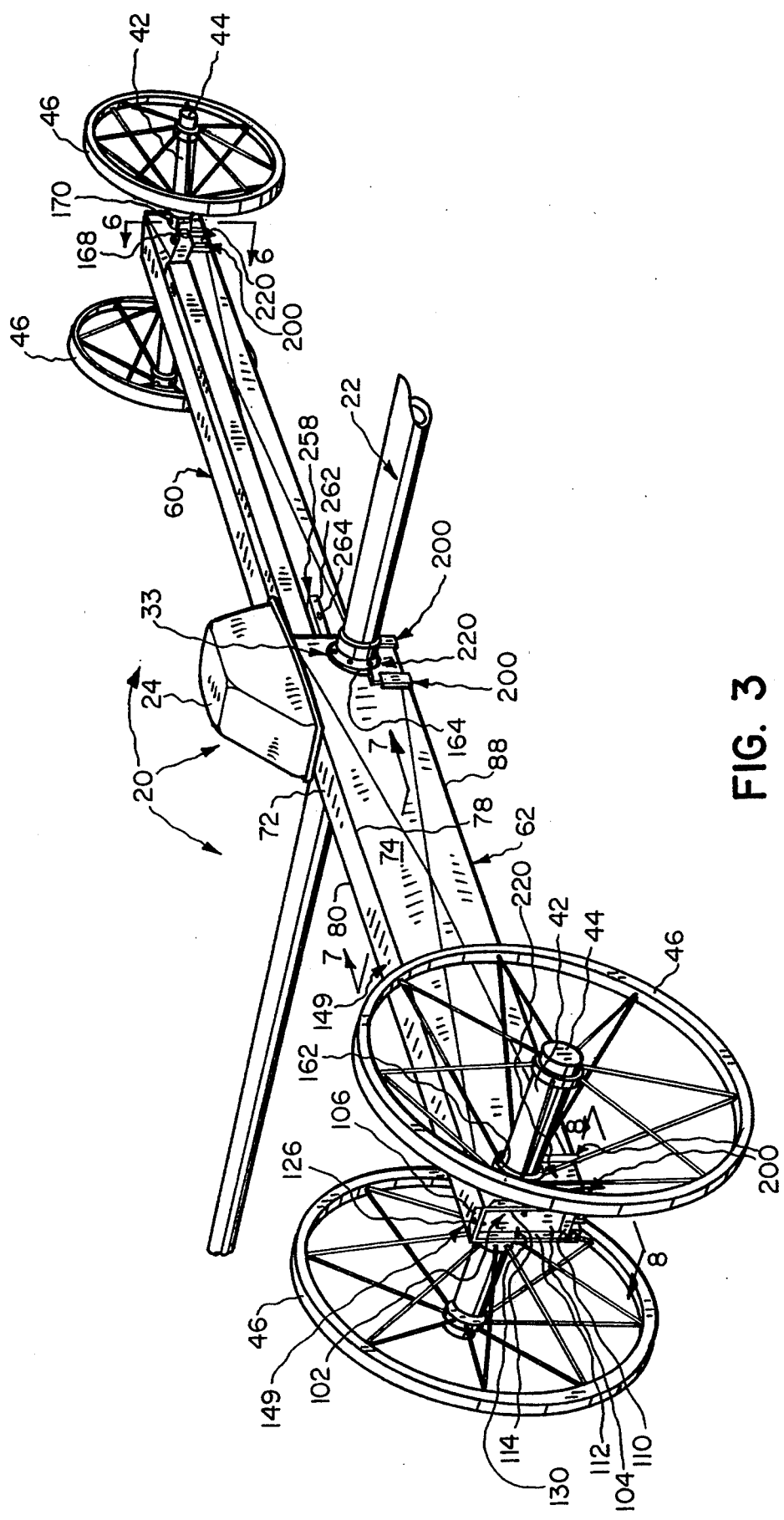
FIG. 3 is a perspective representation of one dual canopy embodiment of the present invention mounted upon a frame member of an irrigation mover to generally shroud both drive chains.

Reference is now made to FIG. 3, which illustrates one embodiment of the present invention supported upon and carried by the irrigation mover 20.

The illustrated embodiment comprises front and rear irrigation guards, generally designated 60 and 62, respectively. The water guards 60 and 62 comprise housing, guards, covers, canopies, shields or hoods by which the drive chains 50 and 52 are generally encapsulated so that little if any irrigation water reaches either. While illustrated and described as comprising galvanized sheet metal bent and cut into a generally rectangular configuration, water guards 60 and 62 could be manufactured from other materials which either prevent or resist corrosion due to water such as various synthetic resinous materials and various fabrics such as waterproof canvas and resin impregnated cloth.

The water guard 60 is separately illustrated in perspective in FIG. 5, being viewed from the left side thereof as seen in FIG. 3, while the water guard 62 is separately illustrated in FIG. 4, being viewed from the right side, as illustrated in FIG. 3.

In reference to FIG. 4, irrigation guard 62 comprises a hollow, generally rectangularly-shaped configuration which may be crimped along lines 64 and 66 at any location desired, to the extent advisable to those skilled in the art, to prevent undesired flexing thereof. The irrigation guard 62 comprises a first main body or hollow housing 68, which is generally inverted U-shaped in its cross-sectional configuration as best illustrated in FIG. 12. The U-shaped housing 68 is centrally hollow at 70, and is illustrated as being fabricated of sheet metal. Except for certain inverted U-shaped slots placed therein, and end closure or cap and a cut out portion at the front left area, as viewed in FIG. 3, the cross-sectional configuration of housing 68 is generally uniform.

Thus, the inverted U-shaped housing 68 comprises a top wall 72 and parallel spaced side walls 74 and 76, which are formed as one piece and, therefore, are integral with the top wall 72 at corners 78 and 80, respectively. The bottom of the hollow housing 68 is centrally open but comprises opposed slider guides, generally designated 82 and 84, respectively. Slider guard 82 is illustrated as being an extension of wall 74 and comprises a short bottom wall 86 disposed at a right angle to and one-piece integral with the wall 74 at corner 88. Short bottom wall 86 merges with a vertical wall 90 at corner 92, a predetermined distance offset from but parallel to wall 74. The short vertical wall 90 merges with a wall 94 at corner 96. Wall 94 is substantially horizontal and, therefore, is not only integral with, but disposed at 90° to wall 90. The horizontal width of wall 94 is less than that of wall 86 and, therefore, a space exists between the wall 94, at blunt edge 98 and the interior surface of wall 74, accommodating insertion and removal, as desired, of a bottom slider plate, as hereinafter more fully described.

The slider guide 84 is one-piece integrally connected to wall 76, but otherwise is identical to slider 82, except being of opposite hand. Accordingly, the components comprising slider guide 84 have been numerated identical to slider guide 82 and no further description thereof is necessary.

Figure 7:
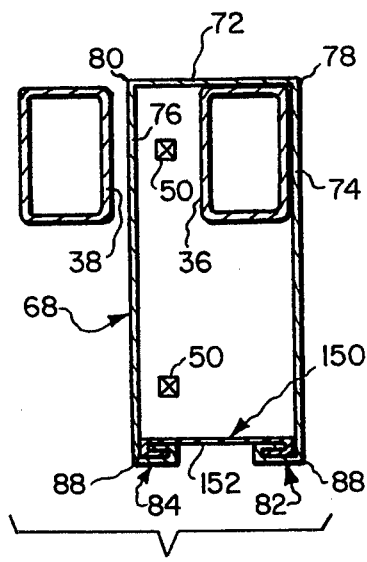
FIG. 7 is a cross-section taken along lines 7—7 of FIG. 3.

It is to be appreciated that housing 68, in the installed position, is contiguously supported upon frame member, beam, or rail 36, as illustrated in FIG. 7, to shield the drive chain 50 from irrigation spray.

It is to be appreciated that the trailing edge of the housing 68 at blunt distal edge 100 (FIG. 12) is disposed in a generally vertically directed plane. The opening to housing 68 at edge 100 is substantially closed, in the assembled condition, by a removable contoured end plate, closure or cap, generally designated 102 (FIG. 12). As illustrated, the end closure 102 comprises a recessed central planar wall 104, a top, U-shaped flange member 106 with interior and exterior walls, both walls being apertured at 104, an upwardly directed reverse lip 110, forming the lower portion of wall 104, and U-shaped opposed side flange members 112 and 114 each with interior and exterior walls, both walls of each being apertured at 116 and 118, respectively.

The apertures 108, 116, and 118 are aligned, when the end closure 102 is properly inserted, with apertures 120, 122, and 124, respectively. It is to be appreciated that U-shaped flange member 106 contiguously engages the top and bottom surfaces of the top wall 72, whereas the U-shaped side flange members 112 and 114 are contiguously received in female-male relationship with the end portion of walls 76 and 74, respectively, to achieve the aperture alignment mentioned above.

When the apertures are appropriately aligned, sheet metal screw 126 is threaded through the aligned apertures 120 and 108, the sheet metal screw 128 is threaded through the aligned apertures 124 and 118 and the sheet metal screw 130 is threaded through the aligned apertures 122 and 116 to secure the end closure 102 in its installed position, as illustrated in FIGS. 3 and 4.

The slider guides 82 and 84 receive fore and aft bottom slider plates, generally designated 150, one of which is illustrated in FIGS. 7 and 12. It is preferred that the fore and aft slide plates 150, which are or may be identical and oppositely directed, each cover approximately one-half the bottom area between the slide guides 82 and 84.

Since the two slider plates are identical, only one will be described. Slider plate 150 comprises a horizontally directed bottom wall 152 and downwardly located U-shaped edges 154 and 156, which are shaped and sized so as to be slidably received between the previously described walls 86 and 94 of guides 82 and 84. This accommodates a sliding insertion and removal of the bottom slider plate 150. To further facilitate insertion and removal, each slider plate 150 comprises an erect end flange 151, comprising an extension of the bottom wall 152, which is illustrated as being reversed upon itself. End plate 151 can be manually grasped to pull or push the associated slider 150 into or from its male-female relation with guides 82 and 84.

Thus, with the slider plates 150 removed, the housing 68 is placed upon the rear portion of the beam 36, as illustrated in FIG. 7, by simply lowering the housing 68 over the beam 36, following which the two slider plates 150 are oppositely fitted within and rectilinearly displaced along guides 82 and 84 to achieve the position illustrated in FIG. 7. Similarly, the two opposed slider plates 150 may be removed in advance of removal of the housing 68 from the beam 36, using the reverse steps mentioned above, on such occasions when removal is desired. On some applications, the covering may be reversed with access wall and slider on the top of housing.

Having described the distal end 149 of the irrigation guard 62, attention is directed to the intermediate portions of the irrigation guard 62. Specifically, on the right side at the distal end 149 and at the proximal end 166, respectively, as illustrated in FIG. 3, two inverted U-shaped openings, i.e., opening 162, disposed juxtaposed the end closure 102, and opening 164 disposed adjacent the proximal end 166. It is to be appreciated that the inverted U-shaped slots 162 and 164 extend downward through and eliminate the guides 82 and 84 at the base of the slots, to accommodate insertion by vertically lowering the housing 68 over certain appurtenances of the irrigation mover 20, as explained hereinafter in greater detail.

Similarly, the distal end at the left side of the irrigation guard 62, as viewed in FIG. 3, comprises two spaced inverted U-shaped slots 168 and 170, respectively. See FIG. 6. As explained hereinafter in greater detail, the inverted U-shaped slot 168 has a smaller top arc and, accordingly, a smaller width than slot 170, for purposes yet to be explained. The slots 168 and 170 likewise extend downward through and, therefore, eliminate guides 82 and 84 at the lower regions of these slots.

The proximal or leading portion 166 of the irrigation guard 62 on the left face thereof, as viewed in FIG. 3, comprises a cut out region as illustrated in FIG. 11. Distal end portion 166 comprises a vertically directed edge 167. The cut out portion illustrated in FIG. 11 primarily accommodates the location and rotation of sprocket 26 (FIG. 1). The cut out portion comprises a diagonal top edge surface 180 which extends from top wall edge surface 167 and joins edge surface 182 of the top wall 72, which exposed beyond termination of the wall 76 a predetermined distance sufficient to accommodate spatial rotation of sprocket 26. Edge 182 merges through about 90° with vertical edge 184, which, as illustrated, spans about one-third the vertical distance of wall 76. Edge 184 merges through about 90° with curvilinear edge 188 of wall 76. Curved edge 188 traverses from the horizontal to the vertical where edge 188 merges with vertical edge 190. The associated edge of the guide 84 lies within the same vertical plane as does edge 190, as illustrated in FIG. 11.

As is clearly shown in the Figures, the inverted U-shaped slots 162, 164, 166, and 170 each comprise a pair of parallel vertical edges, each vertical edge receiving an S-shaped slider guide, generally designated 200. Thus, identical though opposite hand, slider guides 200 are disposed at the opposite vertical sides of each inverted U-shaped slot, e.g., slot 162. Since each guide 200 is identical to the other guides 200, although one-half are of opposite hand, only one needs to be described.

Figure 10:
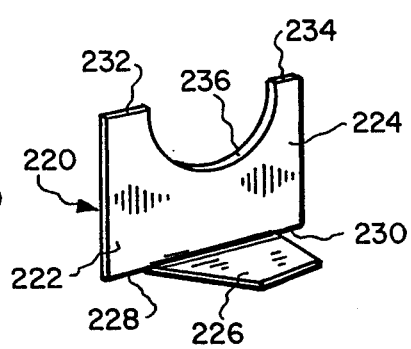
FIG. 10 illustrates in perspective a slider used in conjunction with appurtenance-accommodating slots along the sides of the two canopies illustrated in FIGS. 3-5.
Figure 9:
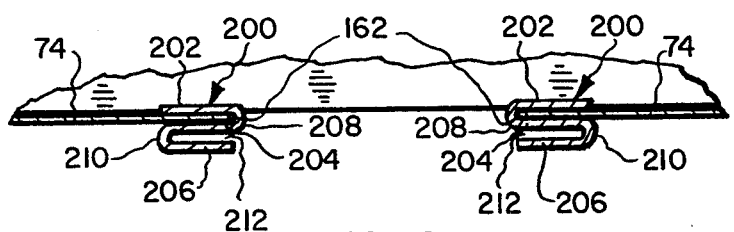
FIG. 9 is an enlarged fragmentary cross-sectional view taken along lines 9—9 of FIG. 8.

To this end, reference is made to FIG. 9, which illustrates two slider guides 200 placed at opposite sides of the inverted U-shaped slot 162 disposed in wall 74. Each guide 200 comprises sequential spaced parallel wall portions 202, 204, and 206, seriatim from inside out. Inside wall portion 202 and central wall portion 204 are formed as one piece and are integrally connected by a reverse direction connector 208. Similarly, reverse connector 210 connects central wall portion 204 to outside wall portion 206. The wall portions 202 and 204 are spaced one from the other a distance substantially equal to the thickness of the wall 74, which contiguously fits between wall portions 202 and 204 and is there secured by solder, adhesive, bonding agent, or a mechanical fastener, such as a sheet metal screw. A slot or uniform space 212 exists between wall portions 204 and 206, the width of which is slightly greater than the thickness of the slider plate which can be inserted therein and reciprocated back and forth along the slot 212. One such slider plate, generally designated 220, is illustrated in FIG. 10.

When the pairs of guides 200 at a given slot, such as 162, are installed, they are oriented substantially as illustrated in FIG. 9 so that the opposed slots 212 are aligned and are spaced from each other a predetermined distance so that the slider edges 222 and 224 of the slider 220 respectively fit in the opposed slots 212 snugly, but so as to prevent inadvertent removal, but permit manual displacement for insertion and removal of the slider plate.

Figure 8:
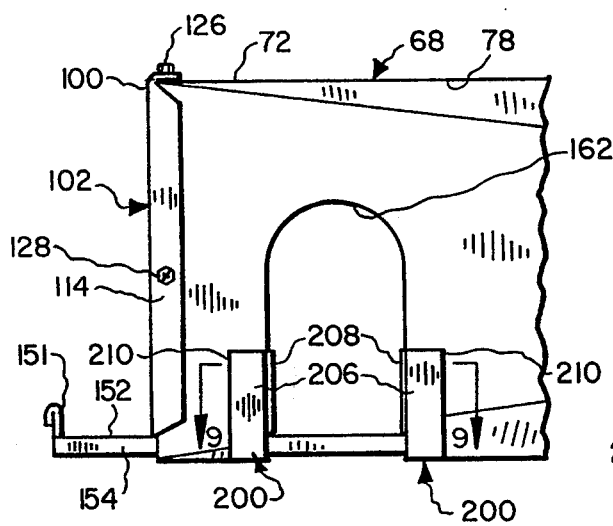
FIG. 8 is an enlarged fragmentary side elevation taken along lines 8—8 of FIG. 3.

In addition to the vertical wall edges 222 and 224, the slider 220 is substantially linear, except for a tongue 226, which extends into the hollow interior of the associated irrigation guard. The tongue 226 is disposed at 90° to the remainder of the slider plate 220 and assists in manual insertion and removal of the slider 220 in respect to the opposed slots 212. The tongue 226 is disposed at the bottom of the slider and is offset at 228 and 230 to allow the edge portions 222 and 224 to be unobstructed for placement, without obstruction, in the opposed slots 212. The top edge surface of each slider 220 comprises two spaced horizontally directed top edge surfaces 232 and 234 interconnected by a curvilinear or arch-shaped edge surface 236, the curvature which continues the curvature of the top edge of the associated inverted U-shaped slot. While sliders 220 are illustrated as being in place in FIGS. 3 through 6, they are illustrated as being removed in FIGS. 8, 9, and 11.

It follows that the height of any slider 220 will be selected so that the arc at edge 236 thereof will align with and match the arc of the associated inverted U-shaped slot to thereby form a circle only slightly larger than the irrigation mover appurtenance adapted to extend therethrough. In this way, entry of irrigation spray through the slots 162, 164, 168, and 170 is either prevented or substantially alleviated.

It is to be appreciated that the distal end 166 of the irrigation shield 62 is illustrated as being open, but irrigation spray is not permitted into the interior of the irrigation shield 62 because the proximal end 166 is disposed underneath the housing 24. All openings into which irrigation spray could pass are to be closed or covered. It is to be appreciated that cylindrical housing 42 passes through the two aligned inverted U-shaped slots 162 and 170 at the rear of the irrigation mover 20, a connector between the beams 36 and 38 passes through the one inverted U-shaped slot 168 and the irrigation pipe 22 adjacent ring connector 33 passes through inverted U-shaped slot 164. In each case the cylindrical member or appurtenance passing through the inverted U-shaped slot is contiguous or substantially contiguous with the upper arched edge of the slot. The arcuate edge 236 of the associated slider 220 is contiguous or substantially contiguous with the lower 180° surface of the tubular member extending through the slot.

Reference is now made to FIG. 5, which illustrates the forwardly disposed irrigation guard 60. However, the orientation of the irrigation guard 60 as shown in FIG. 5 is opposite to the installed orientation of the guard 60 as shown in FIG. 3. Guard 60 is installed over the left beam 38 of the frame rather than the beam 36. Therefore, guards 60 and 62 are not longitudinally aligned, but rather are offset. Specifically, guard 60 comprises a proximal end 250, which, when assembled, is positioned substantially beneath the irrigation mover hood 24, and a distal end 252. The irrigation guard 60 is constructed substantially identical to irrigation guard 62, except as described below, and the components thereof which are identical are given numerals in FIG. 5 identical to the numerals given to the corresponding components of the irrigation guard 62. Accordingly, adjacent the distal end 252, on the left side, as viewed in FIG. 3, slot 162 is disposed in wall 74. This slot 162 is equipped with spaced guides 200 and a slider 220 spanning between the two guides 200, as explained above.

Figure 6:
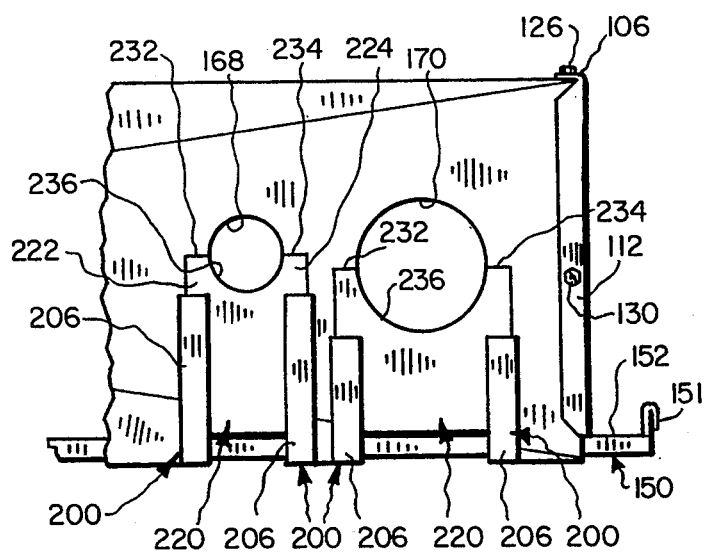
FIG. 6 is an enlarged fragmentary side elevational view taken along lines 6—6 of FIG. 3.

On the right side of irrigation shield 60, as illustrated in FIG. 3, two slots exist, i.e., slot 168, accommodating passage therethrough of a brace between the two beams 38 and 36 and a slot 170, both situated as illustrated in FIG. 6. Slot 170 accommodates passage therethrough of the front axle housing 42. Both inverted U-shaped slots 168 and 170 in irrigation shield 60 are equipped with pairs of guides 200 with a slider plate 220 inserted therebetween, as illustrated in FIG. 6, for purposes mentioned above.

The distal end of the housing 68 of the irrigation shield 60 is closed by an end closure 102, in the manner described above.

The proximal end 250 has a stepped configuration, with the top wall 72 being notched at 254 and stepped at shoulders 256. This region is disposed, when assembled, immediately between hood 24 and, therefore, may remain open or uncovered as illustrated in FIG. 5, without risking introduction therethrough of irrigation spray. However, in appropriate circumstances, the slot 254 and shoulder 256 region may be closed by an appropriately fabricated and positioned closure.

The reduced thickness portion below and proximally beyond shoulder 256 is covered by an inverted U-shaped cover 258 and comprises a central wall 260 and opposed downwardly-directed flanges 262, which are contiguous with the walls 74 and 76 of the housing 68 of irrigation shield 60. The cover 258 is secured by opposed sheet metal screws 264, one of which is illustrated in FIG. 5. The cover 258 is utilized because its location is sufficiently below housing 24 that irrigation spray could access therethrough to the drive chain 52 without the cover 258.

It is to be appreciated that the cut out portion of irrigation shield 62 illustrated in FIG. 11 is absent from irrigation shield 60, as is readily apparent by observation of FIG. 5.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An irrigation mover comprising fore and after wheels, a frame spanning between the fore and aft wheels, a motor and drive chain spanning between the motor and the fore and aft wheels, respectively, the irrigation mover comprising a canopy spaced from but generally shrouding the drive chain disposed between the motor and fore and aft wheels to alleviate the deleterious effects of irrigation water upon the drive chain.

2. A method of alleviating the deleterious effects of irrigation water upon a drive chain of an irrigation mover comprising chain driver wheels, comprising the steps of:
placing a spaced hood around the otherwise exposed drive chain;
causing the hood to be supported away from the drive chain adjacent a motor of the irrigation mover and adjacent the chain-driven wheels.

3. A method of making, installing and using a housing over a drive chain of an irrigation mover, comprising the steps of:
bending a blank of sheet metal into a three dimensional housing of a length, width and depth ample to generally surround the drive chain;
forming openings in the housing for passage of conventional appurtenances of the mover;
placing the housing around the drive chain so as to be supported in a static position between the drive motor and the wheels;
substantially shielding the drive chain with the housing from sprayed irrigating water during irrigation.

4. A method according to claim 3 wherein the placing step comprises supporting the housing upon a frame of mover at least in part by force of gravity.

5. A method according to claim 3 further comprising the step of forming openings in the housing to have at least one selectively openable and closeable appurtenance access site.

6. A method of making and installing of a cover over drive chain of an irrigation mover, comprising the steps of:
forming a three-dimensional covering defining a hollow interior having a length, width and depth ample for placement over the drive chain;
placing the covering around while retaining the covering in spaced relation to the drive chain to shield the drive chain from a spray of irrigation water.

7. A method of extending the useful life of a drive chain of an irrigation mover, comprising the steps of:
placing a substantially water impervious covering around the drive chain;
supporting the covering so that the covering is statically retained with one end disposed adjacent to one or more wheels of irrigation mover and another end disposed adjacent to a motor by which the irrigation mover is driven;
causing the irrigation mover to be displaced as irrigation spray is delivered in the vicinity of the irrigation mover;
sheltering the drive chain from the irrigation spray by intercepting the spray at the covering.

8. An irrigation mover having an elongated covering for a drive chain, said irrigation mover comprising: a motor and fore and aft wheels, said drive train spanning between the motor and the fore and aft wheels; said elongated covering comprising:
a top wall portion;
opposed side wall portions;
a bottom wall portion;
a hollow interior within the top, side and bottom wall portions having a size sufficient to spatially substantially encapsulate the drive chain;
structure by which mover appurtenance extend through the covering in a way generally impervious to irrigation spray.

9. An elongated covering according to claim 8 wherein the bottom wall portions comprise an access wall selectively openable.

10. An elongated covering according to claim 9 wherein the access wall comprises a slider which is manually displaceable in a rectilinear fashion to open and close the bottom of the housing.

11. An elongated covering according to claim 8 wherein the structure comprises slots in the housing each partially closed by a slider plate.

12. A method of encapsulating a drive chain of an irrigation mover comprising the steps of:
lowering an irrigation shield having an open bottom region over a top and sides of the drive chain of the irrigation mover;
removably closing at least a portion of the bottom region of the irrigation shield after the lowering step;
causing transversely extending appurtenances of the irrigation mover to pass through openings in sides of the irrigation shield in a generally impervious way;
supporting the irrigation shield in the lowered position;
operating the irrigation mover to spray irrigation water in the vicinity of the irrigation shield;
intercepting the spray irrigation water with the irrigation so that no more than an immaterial amount of water reaches the drive chain.

13. A method according to claim 12 wherein the removably closing step comprises inserting at least one bottom closing slider into the irrigation shield.

14. A method according to claim 12 wherein the causing step comprises selectively providing slots in sides of the irrigation shield which are open at the bottom region of the irrigation shield during the lowering step and partially closing the slots after the lowering step.

15. A method according to claim 14 wherein the partially closing step comprises inserting a slider over part of each slot by placing the slider into spaced guides at opposite sides of each slot.

16. A method according to claim 12 wherein the supporting step comprises placing the irrigation shield contiguously upon at least one frame member of the irrigation mover.

17. A method according to claim 12 further comprising reversing the removably closing and causing steps followed by lifting of the irrigation shield to a position remote from the drive chain.

* * * * *